United States Patent
Caseau et al.

(10) Patent No.: US 12,438,985 B2
(45) Date of Patent: Oct. 7, 2025

(54) OPTIMIZED TRIGGERING OF TELEPHONE COMMUNICATIONS

(71) Applicant: Orange, Issy-les-Moulineaux (FR)

(72) Inventors: François Caseau, Chatillon (FR); Mark Evans, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 40 days.

(21) Appl. No.: 18/253,029

(22) PCT Filed: Nov. 3, 2021

(86) PCT No.: PCT/FR2021/051931
§ 371 (c)(1),
(2) Date: May 15, 2023

(87) PCT Pub. No.: WO2022/106767
PCT Pub. Date: May 27, 2022

(65) Prior Publication Data
US 2024/0015249 A1    Jan. 11, 2024

(30) Foreign Application Priority Data
Nov. 19, 2020   (FR) .................................. 2011917

(51) Int. Cl.
*H04M 7/00*    (2006.01)
*H04M 3/02*    (2006.01)
*H04M 3/42*    (2006.01)

(52) U.S. Cl.
CPC ............. *H04M 7/003* (2013.01); *H04M 3/02* (2013.01); *H04M 3/42102* (2013.01)

(58) Field of Classification Search
CPC .... H04M 7/003; H04M 3/02; H04M 3/42102; H04M 3/42008; H04M 3/5183; H04M 1/57; H04M 3/42034; H04M 2203/2027
See application file for complete search history.

(56) References Cited

U.S. PATENT DOCUMENTS 9,060,057 B1    6/2015 Danis
10,014,006 B1 *  7/2018 Smith ................... H04M 3/493
(Continued)

FOREIGN PATENT DOCUMENTS

EP      1134960 A2      9/2001
WO      WO-2023027832 A1 *  3/2023  ........ H04M 3/42102

OTHER PUBLICATIONS

International Search Report for International Application No. PCT/FR2021/051931, mailed on Jan. 21, 2022.

*Primary Examiner* — Akelaw Teshale
(74) *Attorney, Agent, or Firm* — Knobbe, Martens, Olson & Bear, LLP

(57) ABSTRACT

A method for managing telephone communication and to a corresponding computer program, storage medium, telephone communication management device, and telephone communication management platform. A request to set up a telephone communication session between a first terminal and a second terminal is received. Each terminal has its own identifier. A first call command is sent to the first terminal. Pickup of the first terminal by a user before the end of a predetermined period is detected. Automatic detection is based on obtaining a signal indicating that the first call command has been accepted, associated with obtaining an indication of a user's interaction with a human-machine interface at the first terminal. A second call command is then sent to the second terminal.

16 Claims, 2 Drawing Sheets

(56) References Cited

U.S. PATENT DOCUMENTS

| | | | |
|---|---|---|---|
| 10,277,745 B1 | 4/2019 | Araujo et al. | |
| 2003/0112945 A1* | 6/2003 | Brown | H04M 3/42 379/201.01 |
| 2003/0112948 A1* | 6/2003 | Brown | H04M 3/4228 379/207.04 |
| 2003/0112952 A1* | 6/2003 | Brown | H04M 3/4931 379/211.01 |
| 2012/0039452 A1* | 2/2012 | Horn | H04M 3/387 379/188 |
| 2012/0230483 A1* | 9/2012 | Bouzid | H04M 3/5158 379/201.02 |
| 2020/0288014 A1* | 9/2020 | Huet | G10L 15/08 |
| 2021/0304742 A1* | 9/2021 | Hung | H04M 3/5158 |

* cited by examiner

OPTIMIZED TRIGGERING OF TELEPHONE COMMUNICATIONS

CROSS-REFERENCE TO RELATED APPLICATIONS

This application is filed under 35 U.S.C. § 371 as the U.S. National Phase of Application No. PCT/FR2021/051931 entitled "OPTIMISED TRIGGERING OF TELEPHONE COMMUNICATIONS" and filed Nov. 3, 2021, and which claims priority to FR 2011917 filed Nov. 19, 2020, each of which is incorporated by reference in its entirety.

BACKGROUND

Technical Field

This disclosure relates to the field of telecommunications.

More particularly, this disclosure relates to methods for managing telephone communications and to devices, platforms for managing identifiers, and the corresponding computer programs and storage media.

Related Art

Among the functionalities offered for managing customer relations, "click-to-call" remains very popular. This feature allows a user to initiate a call to a customer from a workstation. To do so, the user simply clicks on the target's telephone number in the form of a link. In response to this click, a command signal is generated to send to a dialer.

If the dialer is connected to the user's terminal, the terminal then automatically dials the customer's telephone number. With "click-to-call", it is therefore no longer necessary to manually dial telephone numbers, which represents both time saved and the elimination of the associated chance of an error.

In the business world, a professional may need to call a customer but the number appearing to the customer is a business number that is different from his primary number. One of the solutions for triggering such a call using the "click-to-call" functionality is for the dialer receiving the command signal to be connected to a telephony platform. The platform then calls both the professional and the customer, then links the two calls.

However, there is the possibility that it is the professional's voicemail that picks up, and in this case the end customer could be connected to this voicemail.

To avoid this inconvenience, there is therefore a need to allow a professional to call a customer by presenting the customer with a business number that is different from his primary number, while ensuring that the customer is actually put in touch with the professional and not with voicemail.

It is also desirable that this goal be achieved without requiring tedious manipulation on the part of the professional.

SUMMARY

This disclosure improves the situation.

A method is proposed for managing a telephone communication between a first terminal and a second terminal in a communication network, each terminal being respectively associated with at least one identifier in said network, said method being implemented by at least one management device and comprising:

receiving a request to set up a telephone communication session, the request comprising a called identifier corresponding to an identifier of the second terminal;
sending a first call command to the first terminal; and
upon detecting pickup of the first terminal by a user, said detection being based at least on obtaining an indication of a user's interaction with a human-machine interface at the first terminal, sending a second call command to the second terminal.

Thus, a user such as a professional can initiate telephone calls between a first terminal (TC1) for his use and a second terminal (TC2) of his choice, in a simple and rapid manner while avoiding the chance of making an error when entering the number to call.

The customer can be called from a separate device, not directly from the professional's terminal. The number appearing to the customer is therefore the one associated with this separate device, for example a business number.

Furthermore, the device first calls the first terminal or the professional's terminal. The second terminal or customer's terminal is then called only when a user, meaning a human and not for example a voicemail, has picked up, therefore has accepted the communication, at the first terminal or the professional's terminal. More particularly, the management device only detects pickup of the first terminal by the user on the dual condition of obtaining both a signal indicating that pickup of the first terminal has occurred and an indication of the user's interaction with a human-machine interface at the first terminal. One consequence is that it is now certain that the customer can be placed in contact with the professional.

Conversely, the second terminal or the customer's terminal is not called if the communication has not previously been accepted at the first terminal, or if the communication has previously been accepted without there having been any interaction with the human-machine interface at the first terminal.

It is also possible to provide different actions downstream, depending on whether the first terminal was picked up by voicemail or was not picked up at all. Possible actions may include, for example, setting up an automatic callback to the first terminal after a given period of time, recording in an incident log an indication of an inability to reach the user of the first terminal as well as the identified cause of this inability, sending an alert to the user of the first terminal, etc.

The interaction with a human-machine interface is carried out for example on the basis of touch or voice interaction, which is characteristic of pickup by a user and not by voicemail.

Thus, in addition to the actual action of picking up, no potentially tedious additional manipulation is required from the professional.

A computer program is also proposed, comprising instructions for implementing the above method when this program is executed by a processor.

A non-transitory computer-readable storage medium on which the above program is stored is also proposed.

Such a storage medium can be any entity or device capable of storing the program. For example, the medium can comprise a storage means such as ROM, for example a CD ROM or a microelectronic circuit ROM, or a magnetic storage means, for example a USB key or a hard disk.

On the other hand, such a storage medium can be a transmissible medium such as an electrical or optical signal, which can be conveyed via an electrical or optical cable, by radio, or by other means, so that the computer program it contains is executable remotely. The program according to the development can in particular be downloaded over a network, for example the Internet.

Alternatively, the storage medium can be an integrated circuit in which the program is incorporated, the circuit being adapted for executing or for being used in the execution of the aforementioned management method.

A device for managing a telephone communication, that is configured for implementing the above method is also proposed.

An identifier management platform comprising the above device is also proposed.

The above method may optionally comprise certain additional functions as defined below.

For example, the user's interaction with the human-machine interface at the first terminal can be a call acceptance interaction, and the indication of the call acceptance interaction can be an API call from a telephone dialer of the first terminal.

An API call refers to a signal generated via an application programming interface. For example, picking up the first terminal by means of an interaction with the human-machine interface of the first terminal can automatically generate the sending, by an application programming interface of a virtual telephone dialer, of a signal indicative of this interaction.

Thus, the virtual telephone dialer represents an example of an application interface local to the first terminal and configured to signal to the communication management platform an indication of a pickup by a human.

An API call can also be used to report other types of events, such as rejection of incoming call, to the communication management platform.

For example, the indication of the interaction can be received via a data communication channel.

Data communication channel designates any type of communication channel, wired or not, through which computer data interpretable by the communication management platform can travel.

It is thus possible for the first terminal to send signaling messages intended for the communication management platform by using a data channel independent of the voice channel intended to be used for the communication session.

The use of a channel dedicated to signaling from the first terminal to the communication management platform allows optimizing the network resources used for this purpose.

For example, the signal indicating that the first call command has been accepted can be voice and received via a voice communication channel.

It is thus possible to use the existing voice channel to send a signal, for example via the use of a code in voice frequencies, that can be recognized by the communication management platform as corresponding to acceptance of the call. This can confirm the indication of the interaction with the human-machine interface and the signal indicating that the first call command has been accepted, which were otherwise obtained by the communication management platform.

For example, the request to set up a telephone communication session can comprise a caller identifier corresponding to an identifier of the first terminal, and the first call command can comprise a called identifier corresponding to said identifier of the first terminal.

The platform can thus order a first call to the first terminal of a professional regardless of the identifier of this first terminal, simply by obtaining a request indicating this identifier. In a particularly simple manner, this allows the professional to choose, among a plurality of potential identifiers of one or more terminals at his or her disposal, the one the professional wishes to see called.

For example, the request to set up a telephone communication session can result from an interaction with a human-machine interface of a device connected to an application portal.

For example, the method may further comprise, after the second call command has been sent to the second terminal, sending a command to set up a communication session between the first terminal and the second terminal upon detection of pickup of the second terminal.

The communication management platform thus joins the two legs of the communication, respectively towards the first terminal and the second terminal, only when pickup has also occurred at the second terminal.

For example, the method may further comprise sending an end-of-first-call command to the first terminal at the end of the predetermined period if no pickup of the first terminal has been detected and if no rejection of the first call originating from the first terminal has been detected.

It may also be provided that if no pickup has occurred at the second terminal at the end of a predetermined period, the platform automatically implements a predefined action, such as an end-of-call signal command to the first terminal and/or to the second terminal.

For example, the method may further comprise sending an end-of-first-call command to the first terminal upon detecting, before the end of the predetermined period, a rejection of the second call originating from the first terminal.

The above examples of an automatic hang-up initiated by the communication management platform represent improved ease of use for the user of the first terminal in comparison to performing a manual hang-up by interacting with a human-machine interface.

BRIEF DESCRIPTION OF DRAWINGS

Other features, details, and advantages will become apparent upon reading the detailed description below, and upon analyzing the appended drawings, in which.

DETAILED DESCRIPTION OF CERTAIN EMBODIMENTS

The drawings and the description below for the most part contain elements that are certain in nature. Therefore not only may they serve to provide a better understanding of this disclosure, but where applicable they also contribute to its definition.

The general principle of the development is based on opening two telephone communication channels, between a communication management platform as the calling terminal on the one hand, and a first and a second communication terminal as the called terminals on the other hand. The opening of the telephone communication channel to the second communication terminal is triggered only if the communication management platform detects a pickup by a human at the first terminal. This detection is based on the reception by the communication management platform of a signal resulting from an interaction with a human-machine interface at the first terminal.

The development finds numerous applications, in particular in a professional context. For example, it may be desirable to set up a telephone communication between a professional and another party by presenting the other party with a business number that is different from the professional's primary number, while ensuring that the contact person is actually placed in contact with the professional and not with voicemail.

In the remainder of the description, we engage to describe in detail one exemplary implementation of the development.

Figure 1:
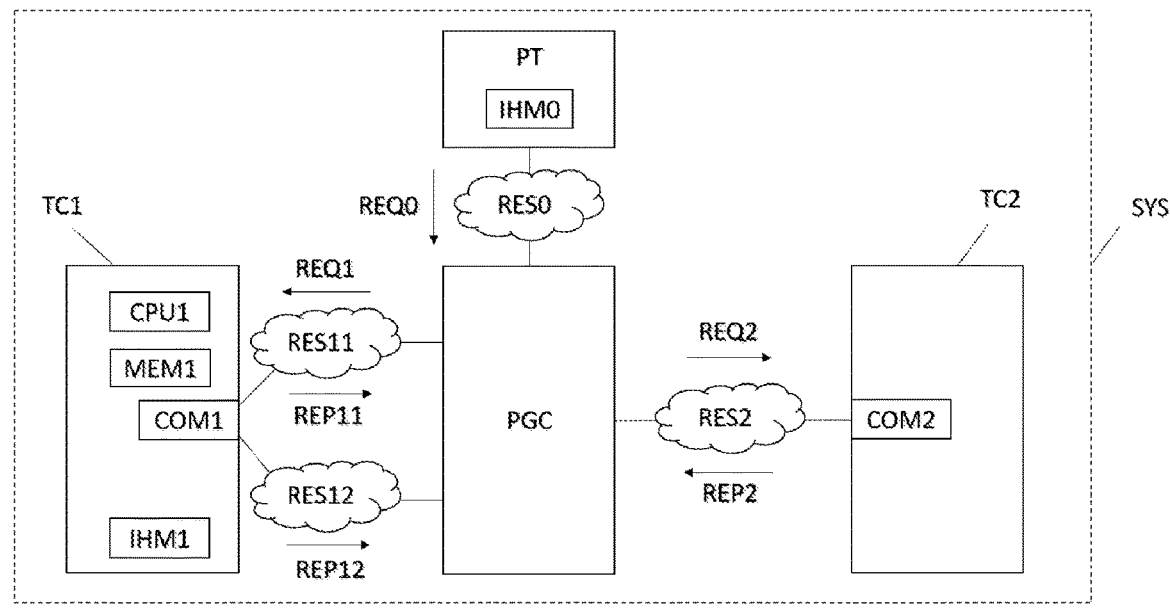
FIG. 1 illustrates a telephone communication system in one exemplary embodiment.

Reference is now made to FIG. 1, which illustrates an example of a telecommunications system (SYS). The system (SYS) comprises a first communication terminal (TC1); a management device or communication management platform (PGC), a second communication terminal (TC2), and a workstation (PT).

In the example presented here, the first communication terminal (TC1), hereinafter the first terminal, is a mobile telephone. The first terminal is for example a smart phone running the iOS, Android, or Linux operating system. Typically, the first terminal (TC1) comprises a SIM card (acronym for "Subscriber Identity Module") provided with a unique subscriber identifier IMSI (acronym for "International Mobile Subscriber Identity"). This unique subscriber identifier IMSI makes it possible to identify the first terminal (TC1) in the network to which the user of the first terminal (TC1) has subscribed. In the example illustrated in FIG. 1, this network, also called the home network, corresponds to a first network. The first network is for example a mobile network such as a GSM network (acronym for "Global System for Mobile communications") or a UNITS (acronym for "Universal Mobile Telecommunications System") or LTE (for "Long Term Evolution") or fifth generation 5G network, or one compliant with a later generation of the 3GPP standard ("3rd Generation Partnership Project"). Furthermore, the unique subscriber identifier IMSI is associated with an identifier which corresponds to the telephone number which allows calling the user of the first terminal (TC1) and therefore setting up a communication with this user. In the remainder of the description, the identifier of the first terminal (TC1) is denoted IAP1.

Alternatively, the first terminal (TC1) is a fixed telephone connected to a private telephone exchange PABX (acronym for "Private Automatic Branch eXchange"). The first network is for example an internal communication network, for example the internal network of a company or a business. The first terminal (TC1) can also be attached to an ADSL (acronym for "Asymmetric Digital Subscriber Line") or FTTH (acronym for "Fiber To The Home") network. In such embodiments as well, the first terminal (TC1) of course has an identifier IAP1.

The first terminal (TC1) comprises a communication module (COM1). The communication module (COM1) is arranged to communicate with the second communication terminal (TC2), also referred to below as the second terminal (TC2), via the communication management platform (PGC) for which a more detailed description will be provided further below in the description. More particularly, the communication module (COM1) is arranged to receive a first request for telephone communication (REQ1), hereinafter first request (REQ1), originating from the communication management platform (PGC), for the purpose of setting up a telephone communication with the second communication terminal (TC2). "First request" is understood to mean a first call command. The first request (REQ1) is received from the communication management platform (PGC) via a first communication channel (RES11). "Receiving a first request for telephone communication", is understood to mean that the communication module (COM1) receives a telephone call.

Typically, the communication management platform (PGC) can send an open-call-session command to the first terminal (TC1) via the first communication channel (RES11) connecting the first terminal (TC1) to the telephone network. This command comprises a called identifier corresponding to the identifier of the first terminal (TC1), and a caller identifier associated with the communication management platform. To do this, the communication management platform (PGC) sends an INVITE type of SIP message to the telephone network, then waits for detection of a human's pickup. Upon receipt of this SIP INVITE message, the telephone network translates this command by sending a create-call-session request message to the first terminal (TC1) via the first communication channel (RES11). This is a CS or PSTN type message.

One will note that in general, a command comprises a caller identifier and a called identifier, the caller identifier being intended to identify the terminal from which the call originates and the called identifier being intended to identify the terminal receiving the call.

In the example illustrated in FIG. 1, it is understood that, in the case where the first terminal (TC1) is a mobile telephone, the communication module (COM1) is arranged to communicate with the communication management platform (PGC) by using a wireless communication network.

At present we are discussing a case where the first terminal (TC1) has received, at a current time, a first request (REQ1) or as defined above a first call command, for the purpose of setting up a telephone communication with the second communication terminal (TC2).

The first terminal (TC1) can be configured to alert the user after receiving the first request (REQ1). For example, a signal can be sent to the user to signal an incoming telephone call. It can be a visual signal, such as a display on a screen or the illumination of an LED. It can also be an audible signal, such as a ringtone. It can also be a haptic signal such as a vibration. The user can then choose to accept the call, decline the call, or ignore the call.

Different signaling messages can be generated by the first terminal (TC1) for sending to the communication management platform in response to the first request (REQ1).

For example, following acceptance of the incoming call, or "pickup", by the user of the first terminal (TC1), the telephone network receives a call acceptance response, which comprises information describing the voice session or VSD (for "Voice Session Description"). Upon receiving this message, the telephone network sends a first response signal (REP11) via the first communication channel (RES11) to the management platform (PGC) to inform it of the acceptance of the call by the user of the first terminal (TC1). This first response signal can for example take the form of an OK type of SIP message.

In reality, such a signaling message does not allow distinguishing between pickup by the user and pickup by his or her voicemail.

A pickup by voicemail can be automatically triggered, for example, in the event of the user refusing the call or in the event of a predetermined period ending without the user accepting or refusing the call.

To make this distinction between pickup by a human and pickup by a voicemail system, it is necessary for the communication management platform (PGC) to obtain additional information.

In the example of FIG. 1, the first terminal (TC1) also has an embedded human-machine interface (IHM1) connected to a processing circuit comprising a processor (CPU1) and a memory (MEM1) which itself is connected to the communication module (COM1).

The human-machine interface (IHM1) is arranged to allow interaction with a user when an incoming telephone call is received at the first terminal (TC1). The user can then interact with the human-machine interface (IHM1) in order to accept or refuse this incoming telephone call. Structurally, the human-machine interface (IHM1) can designate, for example, a virtual button on a touch screen, or a physical button on a keyboard which the user interacts with by touch, or a voice recognition module which the user interacts with vocally.

In one or more embodiments, the user's interaction with the Human-Machine Interface (IHM1) is carried out via a telephone dialer type of application (also called a "dialer"). Thus, when the user interacts with the human-machine interface (IHM1) at the first terminal (TC1) to accept an incoming call, the telephone dialer of the first terminal (TC1) can issue an indication of this call acceptance interaction in the form of an API call.

The memory (MEM1) is arranged to store instructions of a computer program whose execution by the processor (CPU1) results in the operation of the first terminal (TC1). For example, in one or more embodiments, the processor (CPU1) is arranged to generate data representative of an interaction of the user of the first terminal (TC1) with the Human-Machine interface (IHM1).

In the case where the interaction of the user of the first terminal (TC1) with the Human-Machine interface (IHM1) corresponds to an authorization to connect the telephone call, data representative of this authorization are generated. For example, following acceptance of the incoming call, or "pickup", by the user of the first terminal (TC1), the first terminal (TC1) can be configured to send a second response signal (REP12), in addition to the first response signal (REP11), via a second communication channel (RES12) that is other than the first communication channel (RES11). The second response signal is a signaling message comprising information representative of an interaction by the user with the human-machine interface (IHM1) of the first terminal (TC1). For example, such a signaling message can be a "Call picked up" http POST request, sent by a software application of the first terminal (TC1).

Similarly, in the case where the interaction of the user of the first terminal (TC1) with the Human-Machine Interface (IHM1) corresponds to a refusal to connect the telephone call, data representative of this refusal can be generated.

The communication module (COM1) is further configured to send the data representing this authorization or this refusal to connect the telephone communication, to the communication management platform (PGC).

For example, the processor (CPU1) can be arranged to order the generation of the second response signal (REP12), which is other than the first response signal (REP11), when the user interacts with the human-machine interface (IHM1) to reject an incoming call.

The second communication terminal (TC2) comprises at least one communication module (COM2), and may comprise other elements, such as those described above for the first communication terminal (TC1). To do this, the second terminal (TC2) has an identifier IA2. The communication module (COM2) is arranged to communicate with the first terminal (TC1) via the communication management platform (PGC). More particularly, the communication module (COM2) is arranged to receive a second request for telephone communication (REQ2), hereinafter the second request (REQ2), originating from the communication management platform (PGC) for the purposes of setting up a telephone communication with the first communication terminal (TC1). "Second request" is understood to mean a second call command. The second request (REQ2) is received from the communication management platform (PGC) via a communication channel (RES2) in a telephone network. "Receive a second request for telephone communication" is understood to mean that the communication module (COM2) is receiving a telephone call.

In the context of the development, a workstation (PT) designates any form of computer terminal representing a point of access to the functionalities of a computer application. A workstation (PT) is equipped, in particular, with a human-machine interface (IHM0). The computer application is configured to enable a user to initiate a telephone call between the first communication terminal (TC1) and the second communication terminal (TC2). The telephone call is triggered at the user's initiative, for example using a "click-to-call" functionality consisting of ordering the sending of a request to set up a telephone communication session, the request comprising an indication of a caller number or identifier and an indication of a called number or identifier. The caller number or identifier corresponds to an identifier of the first terminal (TC1). The called number or identifier corresponds to an identifier of the second terminal (TC2).

It is assumed that several users in a same user group are each equipped with a first communication terminal (TC1) and a workstation (PT). The first communication terminal and the workstation can be combined. In other words, the first terminal can comprise a computer application which allows implementing "click-to-call". It is also assumed that this group of users has subscribed to an alias management service that allows them to have a shared number or identifier. This shared number or identifier can be used as a caller identifier by a user in the group in order to set up a telephone communication between his or her first terminal (TC1) and a second terminal (TC2) used by the called party.

The following considers a communication management platform (PGC) for implementing communication management between the first terminal (TC1) and the second terminal (TC2).

The communication management platform supports said alias management service. To do so, the communication management platform (PGC) is connected to one or more communication networks so that it is able to communicate, via one or more communication channels (RES0), with the workstation(s) (PT).

This platform is also connected to a telephony network so that it is able to communicate with the communication terminals (TC1, TC2) via one or more communication channels (RES11, RES12, RES2). In that capacity, it has a distinct identifier or service number IPPF and provides the interface between the users of the alias management service and the telephone network. Such a platform, typically managed by the telephone network operator, is arranged to manage call setup requests, or the first call command and second call command, sent to the first terminal (TC1) and second terminal (TC2).

Figure 2:
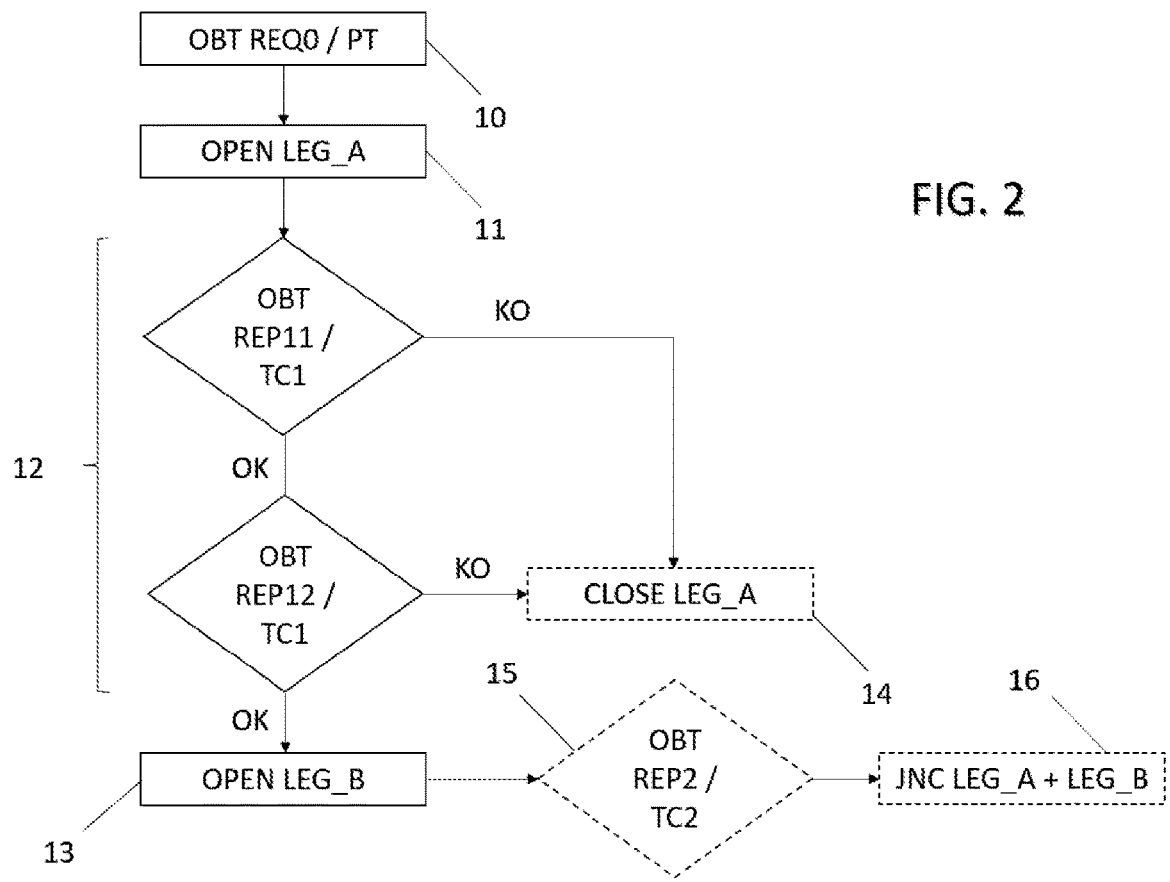
FIG. 2 illustrates a general algorithm of a computer program for, when this program is executed by a processor, implementing a method for managing a telephone communication in one exemplary embodiment.

The method for managing a telephone call between a first terminal TC1 and a second terminal TC2 according to one embodiment is now presented in relation to FIG. 2. This management method is implemented by a management device, it being possible to integrate this management device, according to some embodiments, into the communication management platform PGC.

The communication management platform (PGC) receives, as illustrated in block 10 of FIG. 2, a request (REQ0) to set up a telephone communication session between the first terminal (TC1) and the second terminal (TC2). The request (REQ0) is received via a communication channel (REQ0) with the workstation (PT). The request comprises a caller number or identifier which corresponds to the identifier IAP1 of the first terminal, and a called number or identifier which corresponds to the identifier IA2 of the second terminal.

The communication management platform (PGC) then initiates, as illustrated in block 11 of FIG. 2, a communication with the first terminal (TC1). This communication is initiated by sending and transmitting a first request for telephone communication (REQ1)—or first request, or first call command—via a voice communication channel (RES11). The first request comprises as the caller number or identifier the identifier associated with the service number of the platform, and as the called number or identifier the identifier IAP1 associated with the first terminal (TC1).

The communication management platform (PGC) then waits, as illustrated in block 12 of FIG. 2, for detection of a human pickup. In other words, the communication management platform is configured to receive, in response to sending the first request for telephone communication (REQ1), signaling messages originating from the first terminal (TC1), whether these messages are transmitted via a voice communication channel (RES11) or via a data communication channel (RES12).

In the event that a human pickup is detected for the call in progress, communication with a human at the first terminal (TC1) is considered to have been established and it initiates a communication with the second terminal (TC2), as illustrated in block 13 of FIG. 2. This communication is initiated by sending and transmitting a second request for telephone communication (REQ2)—or second request, or second call command—via a voice communication channel (RES2). The second request comprises as the caller number or identifier the identifier associated with the service number of the platform, and as the called number or identifier the identifier IA2 associated with the second terminal (TC2). Thus, in this embodiment, the second call command, or second request, comprises a caller identifier that is other than the identifier of the first terminal.

Conversely, if the communication management platform (PGC) does not detect a human pickup, or detects an absence of a human pickup, it than considers that no communication with a human has been established at the first terminal (TC1) and commands, as illustrated in block 14 of FIG. 2, the closing of the communication leg to the first terminal (TC1), meaning hanging up by the first calling terminal.

A human pickup is distinguished from a voicemail pickup. More specifically, human pickup is understood to mean acceptance of the call after interaction by the user of the called terminal, as opposed to an automatic answer by voicemail.

It is understood that the absence of human pickup at the first terminal (TC1) designates the following different cases:
  Acceptance of the call by the voicemail associated with the identifier IAP1 of the first terminal (TC1);
  No response received before the end of a predetermined period, for example due to the fact that the first terminal (TC1) is out of a coverage area; or
  Rejection of the call by the user of the first terminal (TC1).

When the communication management platform obtains, via the voice communication channel (RES11), a first response signal (REP11) indicating acceptance of the call at the first terminal (TC1), two cases are possible:
  either the call has been accepted by a human user,
  or the call has been accepted by voicemail.

Conversely, as long as no first response signal has been obtained, the platform can conclude that the call has not yet been accepted. The platform can be configured to order the closing of the first communication leg to the first terminal (TC1) if no first response signal has been obtained by the end of a predetermined period.

The communication management platform can further obtain, via the data communication channel (RES12), a second response signal (REP12) indicating an interaction with the human-machine interface (IHM1) of the first terminal (TC1).

In the event that such a second response signal (REP12) is obtained and indicates a pickup by a user, the platform can conclude that the call has been accepted by a human user, can maintain the first communication leg to the first terminal (TC1), and can open a second communication leg to the second terminal (TC2).

On the other hand, in the event that such a second response signal (REP12) is obtained and instead indicates a refusal of the call by a user, the platform can conclude that the call has not been accepted and can order the closing of the first communication leg to the first terminal (TC1).

Finally, in the event that a first response signal (REP11) has been obtained but no second response signal (REP12) has been obtained, the platform can conclude that the call has been accepted not by a human user but by voicemail, and then also can order the closing of the first communication leg to the first terminal (TC1).

The communication management platform thus first creates a leg of communication with a human user at the first terminal (TC1), then, only in the event that a human pickup has been detected, next creates another leg of communication to the second terminal (TC2), for the purposes of setting up a communication session between the human user at the first terminal (TC1) on the one hand, and the second terminal (TC2) on the other hand.

The fact of deciding to detect a positive pickup only in the event of a human pickup makes it possible to consider a pickup by voicemail as no pickup and therefore allows ending the communication session in progress. Thus, no call is sent to the second terminal, which prevents the user of the second terminal from being placed in communication with a voicemail system.

In certain embodiments, after having transmitted the second request for telephone communication (REQ2) or second call command, the communication management platform (PGC) awaits detection of a pickup, as illustrated in block 15 of FIG. In other words, the communication management platform is configured to receive, in response to sending the second request for telephone communication (REQ2), at least one signaling message originating from the second terminal (TC2) via a communication channel (RES2).

When pickup is detected at the second terminal (TC2), the communication management platform (PGC) sets up the communication session, as illustrated in block 16 of FIG. 2, by linking the legs of the telephone communication respectively established with the first terminal (TC1) and second terminal (TC2).

The communication management platform (PGC) can thus manage the setup of the communication session end-to-end, based on the successive detection of a human pickup 12 at the first terminal (TC1) then of pickup 15 at the second terminal (TC2).

Figure 3:
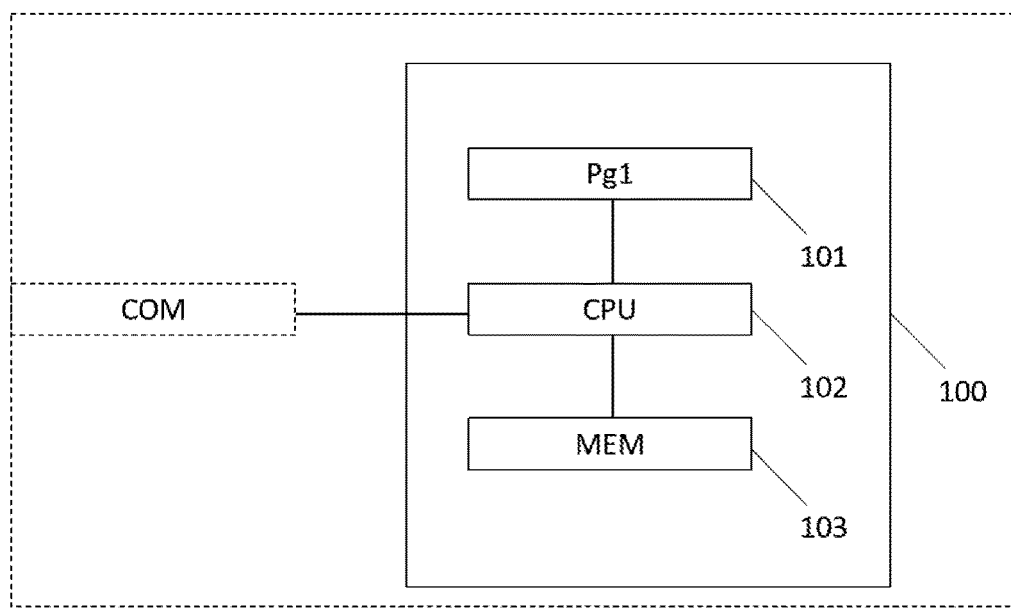
FIG. 3 illustrates a device for managing a telephone communication in one exemplary embodiment.

We now present, in relation to FIG. 3, the hardware structure of a device for managing a telephone communication 100.

The management device 100 comprises a module for receiving requests to set up telephone communication sessions, a module for sending call commands, an automatic pickup detection module, a clock, and a call linking module.

The term "module" can correspond to a software component as well as to a hardware component or to a set of hardware and software components, a software component corresponding to one or more computer programs or sub-programs or in a more general manner to any element of a program able to implement a function or a set of functions.

More generally, such a management device 100 comprises volatile memory 103 (for example RAM memory), a processing unit 102 equipped for example with a processor CPU, and controlled by a computer program Pg1, representative of the aforementioned modules, stored in non-volatile memory 101 (for example ROM memory or a hard disk). At initialization, the code instructions of the computer program are for example loaded into the volatile memory 103 before being executed by the processor of the processing unit 102. The volatile memory 103 contains in particular the values of the identifiers of the first terminal and second terminal. Where applicable, it stores the indications of pickup by a human, the condition(s) for issuing call commands, and the condition(s) for closing calls.

The processor of the processing unit 102 controls, in accordance with the logic diagram of FIG. 2, the receiving 10 of the request to set up a telephone communication session, the sending 11 of the first call command to the first terminal, the detection of human pickup 12 at the first terminal, and the sending 13 of the second call command to the second terminal. The processor of the processing unit 102 can also control, in accordance with the logic diagram of FIG. 2, the sending 14 of the end-of-first-call command, the pickup detection 15 at the second terminal, or the sending of the command to set up a communication session.

FIG. 3 only illustrates one among several possible ways of implementing the management device 100 so that it carries out the steps of the method for managing a communication as detailed above, in relation to FIG. 2 in its various embodiments. Indeed, these steps can be carried out indiscriminately on a reprogrammable computing machine (a PC computer, a DSP processor, or a microcontroller) executing a program comprising a sequence of instructions, or on a dedicated computing machine (for example a set of logic gates such as an FPGA or an ASIC, or any other hardware module).

In the case where the device 100 is implemented with a reprogrammable computing machine, the corresponding program (meaning the sequence of instructions) could be stored on a removable storage medium (for example such as a diskette, a CD-ROM, or a DVD-ROM), or not, this storage medium being partially or entirely readable by a computer or a processor.

The various embodiments have been described above in relation to a management device 100 integrated into a management platform (PGC) of a communication network, equipped with a communication interface COM, but it can more generally be embedded in any server equipment of this network. Alternatively, the computer program enabling execution of the management method can be installed on a remote server and be made accessible to the management device in the form of software offered as a service.

In addition, the functions performed by the management platform (PGC) which has just been described can be distributed over several devices, comprising for example a first device providing the interface with a group of terminals comprising the first terminal (TC1) and a second device providing the interface with the telephone network linked to the second terminal (TC2), the first device and the second device being arranged to communicate with each other via a dedicated interface.

The development which has just been described in its various embodiments offers numerous advantages. In particular, it makes it possible to improve the efficiency of setting up a connection between a human user at a first calling terminal and a second called terminal, while preserving the confidentiality of the primary telephone number of the first terminal.

The invention claimed is:

1. A method of managing a telephone communication between a first terminal and a second terminal in a communication network, each terminal being respectively associated with at least one identifier in the network, the method being implemented by at least one management device and comprising:
   receiving a request to set up a telephone communication session, the request comprising a called identifier corresponding to an identifier of the second terminal;
   sending a first call command to the first terminal; and
   upon detecting pickup of the first terminal by a user, the detection being based at least on obtaining an indication of a user's interaction with a human-machine interface at the first terminal, sending a second call command to the second terminal.

2. The method according to claim 1, wherein the user's interaction with the human-machine interface at the first terminal is a call acceptance interaction, and the indication of the call acceptance interaction is an API call from a telephone dialer of the first terminal.

3. The method according to claim 1, wherein the indication of the interaction is received via a data communication channel.

4. The method according to claim 1, wherein the signal indicating that the first call command has been accepted is voice and is received via a voice communication channel.

5. The method according to claim 1, wherein the request to set up a telephone communication session comprises a caller identifier corresponding to an identifier of the first terminal, and the first call command comprises a called identifier corresponding to the identifier of the first terminal.

6. The method according to claim 1, wherein the request to set up a telephone communication session results from an interaction with a human-machine interface of a device connected to an application portal.

7. The method according to claim 1, further comprising, after the second call command has been sent to the second terminal:
   sending a command to set up a communication session between the first terminal and the second terminal upon detection of pickup of the second terminal.

8. The method according to claim 1, further comprising sending an end-of-first-call command to the first terminal upon detecting, before the end of the predetermined period, a rejection of the second call originating from the first terminal.

9. The method according to claim 1, further comprising sending an end-of-first-call command to the first terminal at the end of the predetermined period if no pickup of the first terminal has been detected and if no rejection of the first call originating from the first terminal has been detected.

10. A processing circuit comprising a processor and a memory, the memory storing program code instructions of a computer program for executing the method according to claim 1 when this computer program is executed by the processor.

11. A non-transitory computer-readable storage medium storing program code instructions of a computer program causing execution of the method according to claim 1 when this computer program is executed by a processor.

12. The method according to claim 1, wherein sending the first call command initiates a telephone call to the first terminal, wherein the first terminal is a called party of the telephone call.

13. The method according to claim 12, wherein the pickup is detected during the telephone call.

14. The method according to claim 1, further comprising:
upon detecting pickup of the first terminal by the user, the detecting comprising receiving, over a data communication channel distinct from a voice channel of the first terminal, a confirmation message generated by a dialer application of the first terminal in response to a user's interaction with a human-machine interface at the first terminal, sending a second call command to the second terminal.

15. A device for managing a telephone communication between a first terminal and a second terminal in a communication network, each terminal being respectively associated with at least one identifier in the network, the device being configured to:
receive a request to set up a telephone communication session, the request comprising a called identifier corresponding to an identifier of the second terminal;
send a first call command to the first terminal; and
upon detecting pickup of the first terminal by a user, the detection being based at least on obtaining an indication of a user's interaction with a human-machine interface at the first terminal, send a second call command to the second terminal.

16. A communication management platform, able to be connected to a telephone communication network, configured to trigger a telephone communication between a first terminal and a second terminal in the communication network, each terminal being associated with at least one identifier in the network, the platform comprising the device for managing a telephone communication according to claim 15.

* * * * *